United States Patent [19]
Kamaishi et al.

[11] Patent Number: 5,447,798
[45] Date of Patent: Sep. 5, 1995

[54] CONCRETE ARTICLE AND METHOD OF PRODUCING SAME

[75] Inventors: Tadami Kamaishi; Hideaki Tanisugi; Keiichi Minami, all of Ohtsu; Akio Takahashi, Kusatsu; Takashi Taniguchi, Shiga; Hiroyoshi Kuramoto, Ichihara, all of Japan

[73] Assignees: Toray Industries, Inc., Tokyo; Toray Thiokol Co., Ltd., Urayasu, both of Japan

[21] Appl. No.: 30,069

[22] Filed: Jun. 22, 1993

[30] Foreign Application Priority Data

Jul. 22, 1991 [JP] Japan ................. 3-180699

[51] Int. Cl.$^6$ .............. C04B 31/44; F16I 9/22
[52] U.S. Cl. ................. 428/414; 428/703; 427/240; 427/403; 427/407.1; 264/270; 264/311; 264/333; 138/137; 138/140; 138/153; 525/481; 525/525; 525/531
[58] Field of Search .......... 428/413, 414, 703; 525/481, 525, 531; 427/240, 403, 407.1; 264/270, 311, 333; 138/137, 140, 153

[56] References Cited

U.S. PATENT DOCUMENTS

| 3,297,056 | 1/1967 | McLaughlin et al. | |
| 3,742,985 | 7/1973 | Rubenstein | 138/141 |
| 4,692,500 | 9/1987 | Hefner, Jr. | 525/529 |
| 4,829,133 | 5/1989 | Hefner, Jr. et al. | 525/481 |

FOREIGN PATENT DOCUMENTS

| 471612 | 2/1974 | Australia. |
| 0357886 | 3/1990 | European Pat. Off.. |
| 48-40818 | 6/1973 | Japan. |
| 48-55553 | 8/1973 | Japan. |
| 59-62794 | 4/1984 | Japan. |
| 60-67144 | 4/1985 | Japan. |
| 62-71614 | 4/1987 | Japan. |
| 62-228793 | 10/1987 | Japan. |
| 63-186723 | 8/1988 | Japan. |
| 73-275890 | 11/1988 | Japan. |

OTHER PUBLICATIONS

Ruropean Search Report.
International Search Report.

*Primary Examiner*—James J. Bell
*Assistant Examiner*—Helen F. Lee
*Attorney, Agent, or Firm*—Fish & Richardson

[57] ABSTRACT

A concrete article having a mixture layer comprising concrete and a polysulfide-modified epoxy resin as an intermediate layer between a concrete body and a cured layer of a polysulfide-modified epoxy resin, which concrete article is excellent in corrosion resistance, durability and workability, and shows good adhesion to the concrete body and to the cured layer of the polysulfide-modified epoxy resin. This concrete article can be produced by applying a coating composition containing the polysulfide-modified epoxy resin to the concrete body in an uncured state.

11 Claims, 1 Drawing Sheet

ANALYZING LINE

|← 100μm →|

POLYSULFIDE-MODIFIED EPOXY RESIN LAYER | MIXTURE LAYER

ANALYZING LINE

|← 100μm →|

POLYSULFIDE-MODIFIED EPOXY RESIN LAYER | MIXTURE LAYER

CONCRETE ARTICLE AND METHOD OF PRODUCING SAME

FIELD OF THE INVENTION

The present invention relates to a concrete article and a method of producing a concrete article, particularly to a concrete article having improved corrosion resistance and durability and suitable for civil engineering and construction use, and to a method of producing such concrete articles.

BACKGROUND OF THE INVENTION

In civil engineering and construction, materials such as soil, rocks, cement, mortar, concrete and metallic materials such as steel are mainly used. In particular, concrete and mortar having cement as their main component are extremely useful for producing various types of architecture and civil engineering constructions. They are inexpensive, have good workability and can easily be formed into various shapes. Concrete articles obtained show excellent mechanical strength, and have become a fundamental element of material civilization.

The concrete articles contemplated in the present invention are molded concrete products such as concrete pipes for water supply and sewerage, culverts, manholes, tunnel walls, gutters and various inlets, shaped surfaces of fresh concrete articles being able to be coated with resins during the molding process. Among such concrete articles, hume concrete pipes, for example, have such advantages as being inexpensive and strong; however, they fail to show good resistance to acids and chemicals. In a corrosive environment, the inner wall of the hume concrete pipe will corrode so that a fragile layer will be formed with the lapse of time.

In order to prevent such corrosion of the pipe, the inner and outer walls of the pipe are often coated with; (1) a coating composition containing a resin such as a polyester resin, a urethane resin, an epoxy resin or an acrylic resin; or (2) a film or sheet of polyvinyl chloride or polyolefin, a non-woven fabric or a reticulate product of polyester, polyolefin, etc. together with an adhesive resin (Japanese Patent Laid-Open Nos. 48-55553, 59-62794, 62-71614 and 63-275890).

When forming coats with the aforementioned materials, it is demanded that the coating compositions used should have strong adhesion properties to the pipe body, excel in water resistance and in chemical resistance. It is also demanded that the coat formed should have appropriate softness in order to perform follow-up occlusion when the concrete has cracked, and have strong resistance to abrasion by the violently running clean/waste water.

However, because of the difference in a coefficient of thermal expansion between the corrosion-resistant layer obtained from the coating composition and the concrete body, the coating layer tends to peel from the concrete body. Also, the layer obtained from the coating composition does not have sufficient strength and chemical resistance for a composite pipe. Furthermore, such corrosion-resistant layer has rigidity but lacks softness; therefore, it is not capable of performing follow-up occlusion when the concrete has cracked.

With respect to the adhesion of the coating composition to the concrete body, it is desired that the coating composition should be capable of forming a coat strongly adhered to the concrete body even when the surface of the concrete body is wet or covered with water. However, in the case of coating compositions containing commercially available epoxy resins such as bisphenol A-type epoxy resins or acrylic resins, these resins do not have good adhesion properties to the concrete, and when water exists on the surface of the concrete, it is extremely difficult to form a resin coat strongly adhered to the concrete. In addition, layers obtained from these coating compositions will suffer form poor gas barrier properties and poor solvent resistance.

Moreover, since these resin coats have rigidity but lack softness as explained earlier, they are not capable of performing follow-up occlusion when the concrete has cracked. In order to improve the crack follow-up ability, softening of resins can be considered, but softened resins would be poor in chemical resistance and water resistance. There also exists another problem that the abrasion resistance of layers obtained from softened resins is nowhere near the satisfactory level.

On the other hand, adhering sheets or non-woven fabrics of various resins to the inner wall of the pipe body is a very complicated work, and the adhesive agents used to adhere these sheets or non-woven fabrics to the pipe have the same problems as the aforementioned coating compositions. Therefore, the adhesion of these sheets or non-woven fabrics will not be satisfactory, and consequently show poor gas barrier properties.

Thus, the conventional methods of bestowing corrosion resistance to the outer and inner walls of the concrete pipes are not satisfactory, and their execution of coating work is quite complicated.

Accordingly, an object of the present invention is to provide a corrosion-resistant, durable concrete article comprising a layer of a cured epoxy resin modified with a polysulfide, which layer is well adhered to a concrete body, and to a method of producing such concrete articles.

DISCLOSURE OF THE INVENTION

The concrete article according to the present invention has a mixture layer comprising concrete and a polysulfide-modified epoxy resin between a concrete body and a layer of a cured epoxy resin modified with a polysulfide.

The method of producing the aforementioned concrete article according to the present invention comprises applying a coating composition containing a polysulfide-modified epoxy resin to the fresh concrete.

BRIEF DESCRIPTION OF THE DRAWINGS

FIG. 1 (A) is a schematic view showing the rugged boundary observed by FE-SEM; and FIG. 1 (B) is a graph schematically showing the amount of sulfur (S) observed by SEM-XMA.

DETAILED DESCRIPTION OF THE PREFERRED EMBODIMENTS

Figure 1:
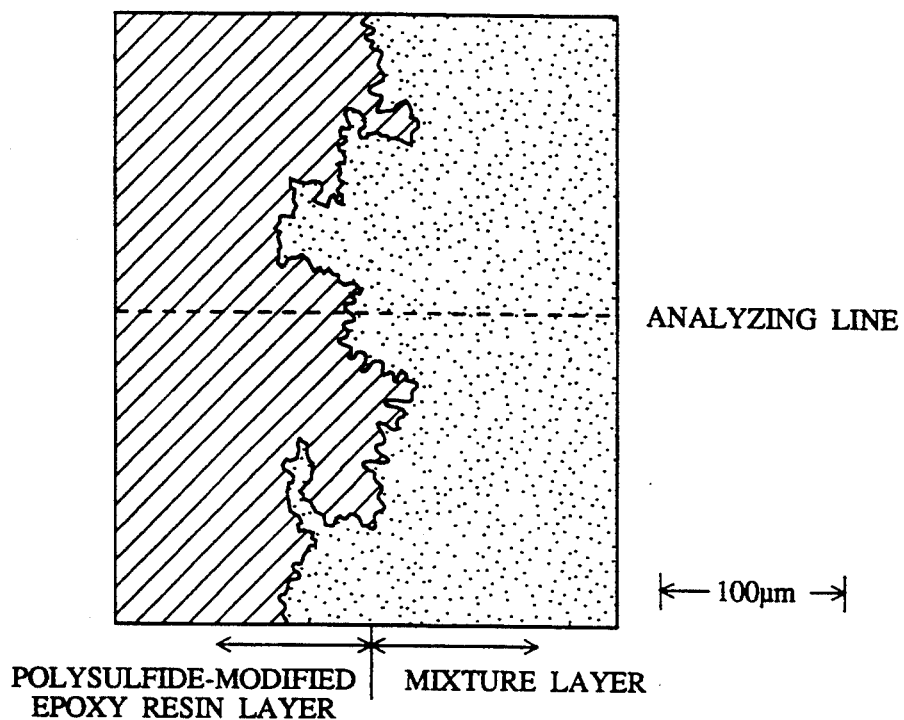
FIG. 1 shows a concrete article according to one embodiment of the present invention in an area near the boundary between a layer of a cured epoxy resin modified with a polysulfide and a mixture layer comprising concrete and a polysulfide-modified epoxy resin.
Figure 1:
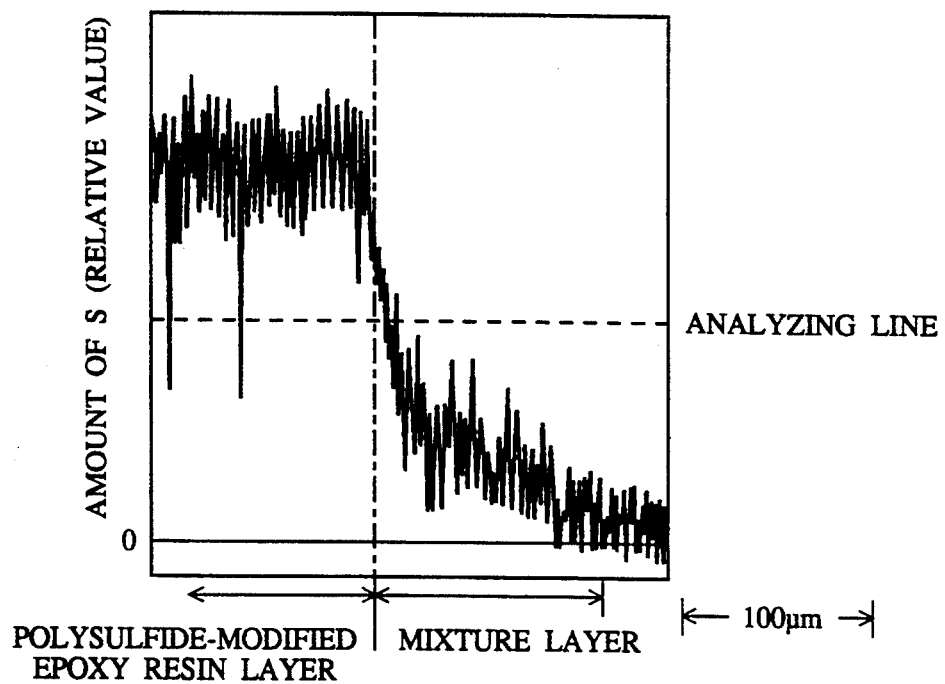

The concrete article according to the present invention has a mixture layer comprising concrete and a polysulfide-modified epoxy resin between the concrete body and the layer of a cured epoxy resin modified with a polysulfide.

Each layer of the concrete article of the present invention will be explained in detail below.

[A] Layer of Cured Epoxy Resin Modified with Polysulfide

The concrete article of the present invention comprises a cured layer containing a polysulfide-modified epoxy resin as a resin component, because the polysulfide-modified epoxy resin satisfies such properties as adhesion strength, chemical resistance, corrosion resistance, and has a strong adhesion to a wet and oily surface, and because it is soft and has a high impact strength due to a polysulfide skeletal structure. A concrete article coated with a cured layer of a polysulfide-modified epoxy resin has strong corrosion resistance, and is capable of performing follow-up occlusion when the concrete has cracked, resulting in high durability. In addition, since the coat of a polysulfide-modified epoxy resin can be formed not only on a dry surface but also on a surface wet with water, the execution of coating work will be carried out easily. Even when a hole is drilled in a wall of a finished concrete article, for example, a concrete pipe, the cured layer of a polysulfide-modified epoxy resin will not peel off or crack, because the cured layer has a good adhesion to the concrete pipe body and a high impact strength. On the contrast, since a coat formed from conventional epoxy resins is fragile, it is likely to be cracked or damaged, when a hole is drilled.

The preferred polysulfide-modified epoxy resin is represented by the general formula (1) shown below;

wherein each of $R^1$ and $R^2$ is an organic group, each of X and Y is a substituent selected from the group consisting of an —S— group, an —O— group and an —NH— group, each of $R^3$ and $R^4$ is a residual group of an epoxy prepolymer having two or more epoxy groups in each molecule, a is an integer from 0 to 5 inclusive (when a=0, at least one of X and Y is the —S— group), and b is an integer from 1 to 50 inclusive.

With respect to the organic groups represented by $R^1$ and $R^2$ in the general formula (1), they are preferably exemplified by;

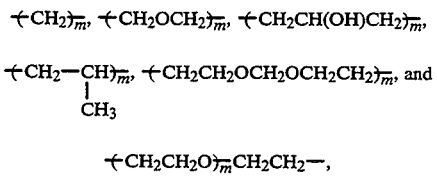

wherein m is an integer of 1 or more, preferably from 1 to 10 inclusive.

In particular, $R^1$ is preferably —CH$_2$CH$_2$OCH$_2$OCH$_2$CH$_2$— in view of the workability and the properties of the resulting cured layers.

$R^3$ and $R^4$ are preferably exemplified by;

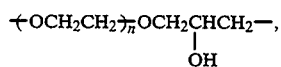

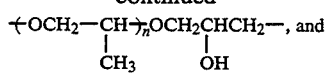

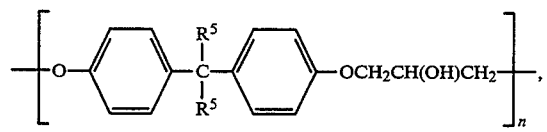

wherein n is an integer of 1 or more, preferably 1–15, and $R^5$ represents H or CH$_3$.

Also, in the general formula (1), the average content "a" of S is within the range of 0–5 (if a=0, at least one of X and Y is the —S— group), preferably 1.5–2.5, and the average content "b" of the aforementioned skeleton is within the range of 1–50, preferably 1–30.

The compound represented by the general formula (1) can be synthesized by an addition reaction between (a) a sulfur-containing polymer or oligomer having sulfur groups such as —S—, —S—S—, —S—S—S— and —S—S—S—S— (except when a=0), whose end groups are functional groups capable of reacting with epoxy groups, such as an —OH group, an —NH$_2$ group, an —NRH group, wherein R is an organic group, and an —SH group; and (b) an epoxy prepolymer having 2 or more epoxy groups in its molecule.

The epoxy prepolymers include epoxy resins having 2 or more epoxy groups in their molecules, that are synthesized by a condensation reaction between aliphatic or aromatic polyols and epichlorohydrin, such as epoxy resins having bisphenol-type skeletons, for example, bisphenol A epoxy resins, bisphenol F epoxy resins, halogenated bisphenol A epoxy resins or other epoxy resins having similar structures.

In the synthesis of the compound represented by the general formula (1), the epoxy prepolymer is added to the sulfur-containing polymer or oligomer in a proportion of 2 equivalent or more relative to the latter.

With respect to such polysulfide-modified epoxy resins, "FLEP-10," "FLEP-50," "FLEP-60," etc. available from Toray Thiokol Co., Ltd. can be used.

The above-mentioned polysulfide-modified epoxy resins may be used with or without combining two or more types thereof.

The cured layer of a polysulfide-modified epoxy resin can be formed by mixing the polysulfide-modified epoxy resin with a curing agent, applying the resulting composition to a predetermined surface of a concrete body, and leaving the resulting coat to stand at room temperature or while heating. With respect to the curing agents, amines or acid anhydrides are mainly used. The amines may be of a cold curing type, a moderate-temperature curing type or a high-temperature curing type. Also, the amines may be primary amines, secondary amines or tertiary amines. Such amines include aliphatic polyamines such as triethylenetetramine, polyamides such as condensates of dimer acids and polyethylene polyamines, aromatic polyamines such as m-xylenediamine, etc. Modified polyamines such as adducts of polyamines and phenylglycidyl ethers or ethylene oxide can also be used. Such modified polyamines are preferable because they are low in volatility and toxicity.

With respect to the acid anhydrides, phthalic anhydride, hexahydrophthalic anhydride, chlorendic anhydride, etc. can be used.

The amount of the curing agent added to the polysulfide-modified epoxy resin may vary depending on (a) the epoxy equivalent of the polysulfide-modified epoxy resin (the weight of the polysulfide-modified epoxy resin per one mol of the epoxy group); and (b) the active hydrogen equivalent of the compound having end amino groups (the weight of the compound per one mol of the active hydrogen). In general, the amount of the curing agent is preferably determined such that the active hydrogen is 0.7 to 1.4 mol per one mol of the epoxy-group in the resulting mixture.

Furthermore, the above curing agents may be mixed with conventional curing accelerators or curing retarders, etc.

Incidentally, the polysulfide-modified epoxy resins may contain epoxy resins formed by the polymerization of the epoxy prepolymers excessively added in the synthesis process, or epoxy monomers or oligomers. Also, the polysulfide-modified epoxy resins may contain up to 50% by weight of resins and/or compounds that are compatible with the polysulfide-modified epoxy resins, for example, alkyd resins, polyvinyl formals, phenol resins, polyvinyl acetals, urea resins, melamine resins, and various fatty acids.

Various solvents may be added to the liquid coating composition containing the polysulfide-modified epoxy resin in order to lower the viscosity of the coating composition at the time of application thereof, thereby increasing the film-forming ability of the composition and improving the properties of the cured coat.

Such solvents include ketones such as methyl ethyl ketone, esters such as ethyl acetate, chlorinated hydrocarbons such as 1,2-dichloroethane, aromatics such as toluene, ethers such as diethyl ether, etc.

The amount of the solvent added is preferably 0.5–500 parts by weight per 100 parts by weight of the polysulfide-modified epoxy resin.

When vaporization of the solvent causes a problem, or when the properties of the cured coat are desired to be changed, various suitable reactive diluents may be added. Such reactive diluents preferably contain one or more reactive epoxy groups in their molecules.

In addition, pigments, bulking fillers, reinforcing fillers, etc. can be added to a homogeneous mixture fluid containing the polysulfide-modified epoxy resin. Usable as the pigments are (1) fine, inorganic or organic powders such as talc, calcium carbonate, kaolin, polyethylene and polystyrene; (2) organic or inorganic pigments for coloring such as soil particles, metal powder, lake, pigment color and carbon; or (3) soluble dyes such as triphenylmethane-, anthraquinone-, or naphthol-base dyes, etc.

With respect to the bulking fillers and the reinforcing fillers, fine, inorganic powders such as cement powder, humed silica, mica, glass flake and asbestos; fine aggregate; gravel; fibers such as polyolefin fibers, polyacrylonitrile fibers, carbon fibers and glass fibers, etc. can be used. In particular, in the case of a hume concrete pipe through which pebbles, sand or gravel will flow, silica powders such as silica sand are preferably added in order to improve the abrasion resistance of the cured coat.

The amounts of the aforementioned additives are preferably such that the pigments are 0.001–300 parts by weight, the bulking fillers are 1–400 parts by weight, and the reinforcing fillers are 0.1–30 parts by weight per 100 parts by weight of the polysulfide-modified epoxy resin.

The above inorganic powders may be added to the polysulfide-modified epoxy resin at once. Alternatively, a part of the inorganic powders may be added to the polysulfide-modified epoxy resin, and after applying a liquid composition of the polysulfide-modified epoxy resin to a surface of a fresh concrete body, the rest of the inorganic powders may be applied to the resin coat while the resin coat is still in a liquid state, so that the inorganic powders can sink into the liquid coat by a gravity or a centrifugal force. Further, all of the inorganic powders may be applied to a liquid coat of the polysulfide-modified epoxy resin on the fresh concrete body, so that the inorganic powders can sink into the liquid coat by a gravity or a centrifugal force. The addition of such bulking fillers is advantageous in respect to cost reduction, because it leads to a decrease in the amount of the resin used.

The thickness of the layer of a cured epoxy resin modified with a polysulfide may be determined depending on the applications of the concrete articles. In general, the thickness of the cured layer is preferably 0.1–10 mm, more preferably 0.5–5 mm.

[B] Mixture Layer Comprising Concrete and Polysulfide-modified Epoxy Resin

In the present invention, the mixture layer which exists between the concrete body and the layer of a cured epoxy resin modified with a polysulfide may have a composition of concrete and the polysulfide-modified epoxy resin in unrestricted proportions.

The mixture layer can be identified, for example, by observing a fractured surface of the concrete article with FE-SEM, and by measuring the distribution of a sulfur content by SEM-XMA.

For example, FIG. 1 shows a concrete article according to one embodiment of the present invention in an area near the boundary between the layer of a cured epoxy resin modified with a polysulfide and the mixture layer. Specifically, FIG. 1 (A) is a schematic view showing the rugged boundary between the layer of a cured epoxy resin modified with a polysulfide and the mixture layer observed by FE-SEM (X-650, a microscanning-type X-ray microscope produced by Hitachi, Ltd.) at a magnification of 300. FIG. 1 (B) is a graph schematically showing the distribution of sulfur observed by SEM-XMA (S-800, a field emission electron microscope, produced by Hitachi, Ltd.) at a magnification of 300. Incidentally, this concrete article was produced by applying a solution of the above-mentioned polysulfide-modified epoxy resin (comprising 100 parts by weight of a polysulfide-modified epoxy resin and 28 parts by weight of a curing agent) at a thickness of 4 mm onto a fresh concrete body having a thickness of 2.5 cm.

As is clear from FIG. 1, a large amount of sulfur is distributed in the cured layer of the polysulfide-modified epoxy resin on the left-hand side of the broken line in FIG. 1 (B), and the sulfur content does not go down to zero immediately after crossing the boundary shown by the broken line in FIG. 1 (B), resulting in the distribution of sulfur extending to approximately 120 $\mu$m from the boundary. This fact indicates that the polysulfide-modified epoxy resin enters into the fresh concrete body. Thus, it is confirmed that a mixture layer (intermediate layer) comprising the polysulfide-modified epoxy resin and the concrete is formed in a range of about 120 $\mu$m.

Since such a mixture layer is formed by diffusing the cured polysulfide-modified epoxy resin into the fresh concrete, the polysulfide-modified epoxy resin in the mixture layer is generally the same as in the cured polysulfide-modified epoxy resin layer.

Also, as shown in FIG. 1 (A), the boundary of the cured layer of the polysulfide-modified epoxy resin and the mixture layer is preferably rugged. The ruggedness of the boundary is defined by a ratio of a length of the boundary between two arbitrary points on the boundary to a length of a straight line between the above two points. Specifically, on a photomicrograph (magnification: 300) of the concrete article near the boundary observed by FE-SEM, a linear distance (A) between two arbitrary points and a distance (B) of the boundary between the two arbitrary points are measured, and a ratio of B/A is calculated. The ruggedness (B/A) is preferably within the range of 2–50.

The above mixture layer comprising the polysulfide-modified epoxy resin and concrete preferably has a thickness within the range of 5–500 μm, more preferably 10–300 μm. If the thickness of the mixture layer is less than 5 μm, it would suffer from poor adhesion to the concrete body. On the other hand, it is difficult to form the mixture layer having a thickness of more than 500 μm.

[C] Concrete Layer

In the present invention, the concrete layer (body) can be formed by adding a cement (for example, comprising 65 weight of CaO, 22 weight % of $SiO_2$, 6 weight % of $Al_2O_3$, 3 weight % of $Fe_2O_3$ and 2 weight % of $SO_3$) to aggregates such as sand, shingle, gravel, crushed rock, soil and clay. The amount of the aggregate added to the concrete is preferably 40–90 weight % on a solid basis.

The thickness of the concrete layer (body) may vary depending on the shape and size thereof, and it is generally within the range of about 1.5–50 cm.

The production of the concrete article of the present invention comprising the above-mentioned layers will be explained below.

First, an uncured concrete layer (body) is formed. The shape of the uncured concrete body is not specially restricted, and the uncured concrete body may be in any shape, for example, a hume pipe, a culvert, a manhole for water supply or sewerage, a tunnel wall, a side ditch, a house-inlet or an underground passage.

In the case of a pipe such as a hume pipe, it can be formed by pouring a ready mixed concrete into a cylindrical steel mold and rotating the mold for centrifugal molding.

Immediately after completion of molding, a mixture (liquid composition) containing the polysulfide-modified epoxy resin is applied to a surface of the fresh concrete body, which is still in a wet state.

The application of the liquid composition can be effected by a spraying method, a brushing method, a dipping method, a pouring method, etc. depending on the situation. In the case of forming a layer of the polysulfide-modified epoxy resin on an inner surface of a pipe such as a hume pipe, it is preferable that a liquid composition containing the polysulfide-modified epoxy resin is poured into a still wet fresh concrete pipe centrifugally molded in a cylindrical steel mold, and that the mold continues to be rotated to conduct centrifugal molding so that the poured composition is cast on an inner surface of the uncured concrete pipe. The above application step can be repeated several times if necessary.

In order to improve the adhesion of the coat to the concrete, primers such as amino silanes, urethanes, alkoxy silanes, etc. can be applied to the fresh concrete. However, the direct application of the composition to the fresh concrete without a primer is preferable. Also, fabrics or reticulates of polyolefin fibers, polyacrylonitrile fibers, etc. may be laminated to an inside and/or outside layer of the resin coat.

By applying a liquid composition containing the polysulfide-modified epoxy resin to the fresh concrete body, and aging the concrete simultaneously with curing the coat of the composition, the polysulfide-modified epoxy resin enters into the fresh concrete body, whereby a mixture layer of the polysulfide-modified epoxy resin and the concrete is formed. Thus, the concrete article of the present invention is produced.

The concrete article of the present invention thus produced has a peculiar mixture layer comprising a concrete and a polysulfide-modified epoxy resin between the concrete body and the resin layer, because the polysulfide-modified epoxy resin is used as a coating material for the concrete. It is not exactly clarified why the mixture layer is formed, but the following reasons are considered;

(1) Since the polysulfide-modified epoxy resin has repeating units of polysulfide bonds such as an —S—S— bond in a molecule thereof, the polysulfide-modified epoxy resin has larger chemical affinity for a concrete than ordinary epoxy resins.

(2) The polysulfide-modified epoxy resin is resistant to deterioration by water during the curing process and forms a coat having good softness and strength.

(3) Since the polysulfide-modified epoxy resin has a larger specific gravity (about 1.2 $g/cm^3$) than that of water, it sinks down in water near the surface of the fresh concrete body by a gravity or a centrifugal force.

From the above-mentioned reasons, it is presumed that the polysulfide-modified epoxy resin deeply enters into the fresh concrete body near the surface, thereby forming the mixture layer.

After applying the polysulfide-modified epoxy resin to the fresh concrete, it is further aged with a water vapor, etc. to accelerate the curing. Even after such a curing treatment, the adhesion of the resin layer to the concrete article which is hardened does not become poor. Therefore, the resulting concrete article is much better than those coated with conventional epoxy resins.

The polysulfide-modified epoxy resins used in the present invention show excellent properties as described below, as compared to the conventional epoxy resins. That is, since the polysulfide-modified epoxy resin has soft polysulfide chains in a molecule thereof, it shows proper softness as compared to the conventional epoxy resins that are hard and fragile. As a result, the polysulfide-modified epoxy resin has improved impact resistance and abrasion resistance. Also, if it is tried to improve the softness, the conventional epoxy resins would suffer from deterioration of other properties such as a resistance to chemicals such as acids and alkalis, a solvent resistance and gas barrier properties. On the contrary, the polysulfide-modified epoxy resin shows improvement in the aforementioned properties, and therefore, the properties of the cured polysulfide-modified epoxy resin are better than those of the conventional, hard epoxy resins. It is presumed that such properties of the polysulfide-modified epoxy resin affect the production process and properties of the concrete article of the present invention.

The present invention will be explained in further detail below.

EXAMPLE 1

A cement composition having a cement content of 400 kg/m$^3$ or more per a unit volume, a water-cement ratio of 37–45 and a slump of 5–12 cm was poured into a cylindrical mold having an inner diameter of 26 cm and a length of 30 cm and rotating at an acceleration of 10 G with a centrifugal machine. After the cement composition was uniformly cast on an inner surface of the mold, the mold was further rotated at an acceleration of 30 G for 30 minutes to compact the cement composition to form a hollow, fresh concrete pipe having a thickness of 30 mm.

Thereafter, without removing the fresh concrete pipe from the mold, 100 g of a mixture fluid comprising 100 parts by weight of a polysulfide-modified epoxy resin (FLEP-60, produced by Toray Thiokol Co., Ltd.), and 28 parts by weight of a modified aliphatic polyamine (DAITOCURAR X-2392, produced by Daito Sangyo K.K.) as a curing agent was gradually dropped into the fresh concrete pipe while slowly rotating the mold.

After completion of dropping the mixture fluid into the pipe, the mold was again rotated at an acceleration of 30 G for 10 minutes, to complete the casting of the mixture fluid on the inner surface of the fresh concrete pipe.

The mold was then detached from the centrifugal machine and left to stand at room temperature for 28 days to age the fresh concrete pipe until the concrete pipe became sufficiently strong for practical use. After the aging was completed, the mold was opened to obtain a hardened concrete pipe lined with a cured coat of a polysulfide-modified epoxy resin having a thickness of approximately 500 μm.

This cured coat was subjected to an adhesion test by using a Kenken-type adhesion test machine. As a result, it was observed that peeling of the cured coat took place only due to the breakage of the concrete body. This means that this cured coat had excellent adhesion to the concrete body.

The concrete pipe was cut, and its cut surface was observed by SEM-XMA (X-650, a microscanning-type X-ray microscope, produced by Hitachi, Ltd.) to conduct a composition analysis. As a result, it was confirmed that there was an intermediate layer consisting of a mixture of concrete and a polysulfide-modified epoxy resin and having a thickness of 123 μm on the average between the concrete body and the cured layer of the polysulfide-modified epoxy resin.

Furthermore, the coated surface of the concrete pipe was immersed in an aqueous solution of 10% sulfuric acid at a temperature of 25° C. for 3 months. However, the cured coat showed no sign of change, and its adhesion to the concrete body was not deteriorated.

EXAMPLE 2

A cement composition comprising 950 g of cement, 1910 g of sand, 400 g of water and 19 g of a high-range water-reducing agent (CELLFLOW DF, produced by Dai-ichi Kogyo Seiyaku K.K.) was poured into a cylindrical mold (inner diameter: 20 cm, length: 20 cm) which was rotating at an acceleration of 10 G by a centrifugal machine, so that the cement composition was uniformly cast on an inner surface of the cylindrical mold. The cylindrical mold was further rotated at 30 G for 10 minutes to perform the compaction of the cement composition, thus producing a hollow, fresh concrete pipe having a thickness of 13 mm.

Thereafter, without removing the fresh concrete pipe from the mold, 200 g of a mixture fluid comprising 100 parts by weight of a polysulfide-modified epoxy resin (FLEP-60, produced by Toray Thiokol Co., Ltd.), and 28 parts by weight of a modified aliphatic polyamine (DAITOCURAR X-2392, produced by Daito Sangyo K.K.) as a curing agent was gradually dropped into the fresh concrete pipe while slowly rotating the mold at an acceleration of 2–3 G.

After completion of dropping the mixture fluid into the pipe, the mold was again rotated at an acceleration of 30 G for 5 minutes, to complete the casting of the mixture fluid on the inner surface of the uncured concrete pipe. While rotating the mold at 30 G, 440 g of silica sand (#5) was uniformly scattered onto an inner surface of the fresh concrete pipe. The mold was further rotated for 20 minutes after the addition of the silica sand to cure the mixture containing the polysulfide-modified epoxy resin.

The mold was then detached from the centrifugal machine and left to stand at room temperature for 10 days to age the fresh concrete pipe until the concrete pipe became sufficiently strong for practical use. After the aging was completed, the mold was opened to obtain a hume concrete pipe lined with a cured coat of a polysulfide-modified epoxy resin having a thickness of approximately 4 mm.

This cured coat was subjected to an adhesion test by using a Kenken-type adhesion test machine. As a result, it was observed that the cured coat showed an adhesion of 42 kgf/cm$^2$, and that peeling of the cured coat took place only due to the breakage of the concrete body. This means that this cured coat had excellent adhesion to the concrete body.

The hume concrete pipe was cut, and its cut surface was observed by SEM-XMA in the same manner as in Example 1. As a result, it was confirmed that there was an intermediate layer having a thickness of 100 μm on the average.

During the cutting of the hume concrete pipe, the coated resin layer was not separated from the concrete body. Also, breaking and peeling did not occur when a hole was drilled in the pipe wall.

On a photomicrograph (magnification: 300) taken by FE-SEM (S-800, a field emission electron microscope, produced by Hitachi, Ltd.), a linear distance (A) between two arbitrary points and a length (B) of the boundary between these two arbitrary points were measured to calculate a ratio of B/A as the ruggedness of the boundary. As a result, it was found that the ruggedness was approximately 3.5.

Furthermore, the coated surface of the concrete pipe was immersed in an aqueous solution of 10% sulfuric acid at 25° C. for 3 months. However, the cured coat showed no sign of change, and its adhesion to the concrete body was not deteriorated.

EXAMPLE 3

A hume concrete pipe was produced by a centrifugal molding machine, and 200 g of a mixture fluid comprising 100 parts by weight of a polysulfide-modified epoxy resin (FLEP-60, produced by Toray Thiokol Co., Ltd.), and 28 parts by weight of a modified aliphatic polyamine (DAITOCURAR X-2392, produced by Daito Sangyo K.K.) as a curing agent was applied to an inner surface of the pipe without using silica sand (#5) in the same manner as in Example 2, to obtain a hume concrete pipe whose inner surface was coated with a cured layer of the polysulfide-modified epoxy resin having a thickness of approximately 3 mm.

This cured coat was subjected to an adhesion test by using a Kenken-type adhesion test machine. As a result, it was observed that the cured coat showed an adhesion of 39 kgf/cm$^2$, and that peeling of the cured coat took place only due to the breakage of the concrete body. This means that this cured coat had excellent adhesion to the concrete body.

The hume concrete pipe was cut, and its cut surface was observed by SEM-XMA in the same manner as in Example 1. As a result, it was confirmed that there was an intermediate layer having a thickness of 95 μm on the average. By measuring the ruggedness of the boundary between the cured layer of the polysulfide-modified epoxy resin and the intermediate layer by FE-SEM as in Example 2, it was found that the ruggedness of the boundary was approximately 3.1.

Furthermore, the coated surface of the concrete pipe was immersed in an aqueous solution of 10% sulfuric acid at 25° C. for 3 months. However, the cured coat showed no sign of change, and its adhesion to the concrete body was not deteriorated.

EXAMPLE 4

A hume concrete pipe was produced by a centrifugal molding machine, and 250 g of a mixture fluid comprising 100 parts by weight of a polysulfide-modified epoxy resin (FLEP-60, produced by Toray Thiokol Co., Ltd.), 28 parts by weight of a modified aliphatic polyamine (DAITOCURAR X-2392, produced by Daito Sangyo K.K.) as a curing agent, 20 parts by weight of methylene chloride and 5 parts by weight of fine silica powder (AEROSIL R202, produced by Japan Aerosil, Co., Ltd.) was applied to an inner surface of the pipe in the same manner as in Example 2, to obtain a hume concrete pipe whose inner surface was coated with a cured layer of the polysulfide-modified epoxy resin having a thickness of approximately 3.8 mm.

This cured coat was subjected to an adhesion test by using a Kenken-type adhesion test machine. As a result, it was observed that the cured coat showed an adhesion of 42 kgf/cm$^2$, and that peeling of the cured coat took place only due to the breakage of the concrete body. This means that this cured coat had excellent adhesion to the concrete body.

The hume concrete pipe was cut, and its cut surface was observed by SEM-XMA in the same manner as in Example 1. As a result, it was confirmed that there was an intermediate layer having a thickness of 120 μm on the average. By measuring the ruggedness of the boundary between the cured layer of the polysulfide-modified epoxy resin and the intermediate layer by FE-SEM as in Example 2, it was found that the ruggedness of the boundary was approximately 3.5.

EXAMPLE 5

A cement composition comprising 475 g of cement, 955 g of sand, 200 g of water and 8 g of a high-range water-reducing agent (CELLFLOW DF, produced by Dai-ichi Kogyo Seiyaku K.K.) was prepared. This cement composition was poured into a square pan-shaped mold (length: 260 mm, width: 200 mm, depth: 40 mm) and left to stand. While the fresh concrete was still wet, 250 g of a mixture fluid comprising 100 parts by weight of a polysulfide-modified epoxy resin (FLEP-60, produced by Toray Thiokol Co., Ltd.), and 28 parts by weight of a modified aliphatic polyamine (DAITOCURAR X-2392, produced by Daito Sangyo K.K.) as a curing agent was applied to the concrete.

After leaving the concrete plate to stand for aging at room temperature for 10 days, the mold was detached from the concrete to obtain a concrete plate having a resin coat having a thickness of approximately 4 mm.

This cured coat of the concrete plate was subjected to an adhesion test by using a Kenken-type adhesion test machine. As a result, it was observed that the cured coat showed an adhesion of 35 kgf/cm$^2$, and that peeling of the cured coat took place only due to the breakage of the concrete body. This means that this cured coat had excellent adhesion to the concrete body.

The concrete plate was cut, and its cut surface was observed by SEM-XMA in the same manner as in Example 1. As a result, it was confirmed that there was an intermediate layer having a thickness of 95 μm on the average. By measuring the ruggedness of the boundary between the cured layer of the polysulfide-modified epoxy resin and the intermediate layer by FE-SEM as in Example 2, it was found that the ruggedness of the boundary was approximately 3.1.

COMPARATIVE EXAMPLE 1

A hollow, fresh concrete pipe having a thickness of 25 mm was produced in the same manner as in Example 1.

After 10 days of curing, an inner wall of the hume pipe was ground with a sander in order to remove laitance. Thereafter, 200 g of a mixture fluid comprising 100 parts by weight of a polysulfide-modified epoxy resin (FLEP-60, produced by Toray Thiokol Co., Ltd.), and 28 parts by weight of a modified aliphatic polyamine (DAITOCURAR X-2392, produced by Daito Sangyo K.K.) as a curing agent was centrifugally cast on an inner surface of the uncured hume pipe in the same manner as in Example 2, to obtain the hume concrete pipe whose inner surface was coated with a polysulfide-modified epoxy resin layer having a thickness of approximately 4 mm. After the resin was completely cured, an adhesion test was conducted by using a Kenken-type adhesion test machine. As a result, it was observed that the cured coat showed an adhesion of as low as 23 kgf/cm$^2$, and that peeling took place in the adhesive boundary.

The hume concrete pipe was cut, and its cut surface was observed by SEM-XMA in the same manner as in Example 1. As a result, it was confirmed that there was an intermediate layer having a thickness of only 2 μm on the average. By measuring the ruggedness of the boundary between the cured layer of the polysulfide-modified epoxy resin and the intermediate layer by FE-SEM as in Example 2, it was found that the ruggedness of the boundary was approximately 1.3.

COMPARATIVE EXAMPLE 2

A hume concrete pipe was produced in the same manner as in Comparative Example 1, and without removing the laitance from the inner wall of the pipe, a polysulfide-modified epoxy resin was directly coated to obtain a composite, hume concrete pipe. After the resin was completely cured, an adhesion test was conducted by using a Kenken-type adhesion test machine. As a result, it was observed that the cured coat showed an adhesion of as low as 9 kgf/cm², and that peeling took place in the adhesive boundary.

The hume concrete pipe was cut, and its cut surface was observed by SEM-XMA in the same manner as in Example 1. As a result, it was confirmed that there was an intermediate layer having a thickness of only 3 μm on the average. By measuring the ruggedness of the boundary between the cured layer of the polysulfide-modified epoxy resin and the intermediate layer by FE-SEM as in Example 2, it was found that the ruggedness of the boundary was approximately 1.5.

COMPARATIVE EXAMPLE 3

A cement composition was poured into a square pan-shaped mold and aged for 10 days in the same manner as in Example 5 to obtain a flat concrete plate. Thereafter, 250 g of a mixture fluid comprising 100 parts by weight of a polysulfide-modified epoxy resin (FLEP-60, produced by Toray Thiokol Co., Ltd.), and 28 parts by weight of a modified aliphatic polyamine (DAITOCURAR X-2392, produced by Daito Sangyo K.K.) as a curing agent was applied to the uncured concrete plate. By aging the concrete plate for 10 days, a cured layer of the polysulfide-modified epoxy resin having a thickness of approximately 4 mm was formed.

After detaching the mold from the concrete plate having a cured resin layer, an adhesion test was conducted by using a Kenken-type adhesion test machine. As a result, it was observed that the cured coat showed an adhesion of as low as 14 kgf/cm², and that peeling took place in the adhesive boundary.

The concrete plate was cut, and its cut surface was observed by SEM-XMA in the same manner as in Example 1. As a result, it was confirmed that there was an intermediate layer having a thickness of only 3 μm on the average. By measuring the ruggedness of the boundary between the cured layer of the polysulfide-modified epoxy resin and the intermediate layer by FE-SEM as in Example 2, it was found that the ruggedness of the boundary was approximately 1.2.

COMPARATIVE EXAMPLE 4

A fresh concrete pipe was produced by a centrifugal molding machine, and 200 g of a mixture fluid comprising 100 parts by weight of a wet-bonding epoxy resin (ADEKA RESIN EPES, produced by Asahi Denka Kogyo K.K.), and 30 parts by weight of a curing agent (ADEKA HARDENER EH235G, produced by Asahi Denka Kogyo K.K.) was applied to an inner surface of the uncured concrete pipe in the same manner as in Example 2 in place of 200 g of a mixture fluid comprising 100 parts by weight of a polysulfide-modified epoxy resin (FLEP-60, produced by Toray Thiokol Co., Ltd.), and 28 parts by weight of a modified aliphatic polyamine (DAITOCURAR X-2392, produced by Daito Sangyo K.K.) as a curing agent, to obtain a hume concrete pipe whose inner surface was coated with a cured layer of the polysulfide-modified epoxy resin having a thickness of approximately 4 mm.

This cured coat was subjected to an adhesion test by using a Kenken-type adhesion test machine. As a result, it was observed that the cured coat showed an adhesion of as low as 11 kgf/cm², and that peeling took place only in the adhesive boundary. This means that this cured coat had excellent adhesion to the concrete body.

As a result of drilling a hole in the wall of the hume pipe in the same manner as in Example 2, it was observed that peeling took place in the boundary between the resin and the concrete.

COMPARATIVE EXAMPLE 5

A fresh concrete pipe was produced by a centrifugal molding machine, and 200 g of a mixture fluid comprising 100 parts by weight of an epoxy resin (EPICOAT 828, produced by Yuka Shell Epoxy K.K.), and 40 parts by weight of a curing agent (DAITOCURAR I-2095, produced by Daito Sangyo K.K.) was applied to an inner surface of the uncured concrete pipe in the same manner as in Example 2 in place of 200 g of a mixture fluid comprising 100 parts by weight of a polysulfide-modified epoxy resin (FLEP-60, produced by Toray Thiokol Co., Ltd.), and 28 parts by weight of a modified aliphatic polyamine (DAITOCURAR X-2392, produced by Daito Sangyo K.K.) as a curing agent, to obtain a hume concrete pipe having a cured coat having a thickness of approximately 4 mm in an inner surface thereof.

This cured coat was subjected to an adhesion test by using a Kenken-type adhesion test machine. As a result, it was observed that the cured coat showed an adhesion of as low as 2.5 kgf/cm², and that peeling took place only in the adhesive boundary.

INDUSTRIAL APPLICABILITY

In the concrete article according to the present invention, the cured coat of a polysulfide-modified epoxy resin has a higher film density and improved resistance not only to acids and alkalis but also to solvents than those made of conventional epoxy resins. Also, the gas barrier properties and corrosion resistance of the cured coat of a polysulfide-modified epoxy resin are excellent. Therefore, the concrete article of the present invention has excellent durability. In addition, since the cured layer of this concrete article has appropriate softness and excels in flexibility and impact resistance, it can perform follow-up occlusion when the concrete has cracked.

Furthermore, since the cured coat of the present invention can easily be formed on a concrete surface wet with water or on a fresh concrete surface, the coat resin can be applied to the concrete more easily than the conventional resins. For this reason, the present invention is capable of producing concrete articles having excellent corrosion resistance and durability at a high productivity.

Moreover, the concrete article of the present invention has such a structure that the polysulfide-modified epoxy resin deeply penetrates into the fresh concrete body, resulting in the formation of a mixture layer comprising the polysulfide-modified epoxy and concrete near the surface of the concrete body. Consequently, the adhesion of the cured layer of the polysulfide-modified epoxy resin to the concrete is extremely strong.

The concrete articles obtained according to the present invention are suitable for such use as concrete pipes for water supply or sewerage, culverts, manholes, tunnel walls, gutters and various inlets.

We claim:

1. A concrete article having a concrete body, a cured layer of a polysulfide-modified epoxy resin and a mixture layer comprising concrete and said polysulfide-modified epoxy resin as an intermediate layer between said concrete body and said cured layer of said polysulfide-modified epoxy resin, said intermediate layer being formed by applying a coating composition containing said polysulfide-modified epoxy resin to said concrete body in an uncured state by a centrifugal method and curing said polysulfide-modified epoxy resin.

2. The concrete article according to claim 1, wherein said intermediate layer has a thickness of 5–500 μm.

3. The concrete article according to claim 1, wherein said polysulfide-modified epoxy resin is a high-molecular weight epoxy compound represented by the following general formula:

wherein each of $R^1$ and $R^2$ is an organic group, each of X and Y is a substituent selected from the group consisting of an —S— group, an —O— group and an —NH— group, each of $R^3$ and $R^4$ is a residual group of an epoxy prepolymer having two or more epoxy groups in each molecule, a is an integer from 0 to 5 inclusive (when a=0, at least one of X and Y is the —S— group), and b is an integer from 1 to 50 inclusive.

4. The concrete article according to claim 3, wherein $R^1$ of the polysulfide-modified epoxy resin represented by said general formula is —$CH_2CH_2OCH_2OCH_2CH_2$—, and the average of a is 1.5–2.5.

5. The concrete article according to any one of claims 1 to 4, wherein said cured layer of a polysulfide-modified epoxy resin contains a bulking filler and/or a reinforcing filler.

6. The concrete article according to any one of claims 1 to 5, wherein said concrete body is a hume pipe.

7. A method of producing a concrete article having a concrete body, a cured layer of a polysulfide-modified epoxy resin and a mixture layer comprising concrete and said polysulfide-modified epoxy resin as an intermediate layer between said concrete body and said cured layer of said polysulfide-modified epoxy resin, comprising applying a coating composition containing said polysulfide-modified epoxy resin to said concrete body in an uncured state by a centrifugal method and curing said polysulfide-modified epoxy resin.

8. The method of producing a concrete article according to claim 7, wherein a flowable ready mixed concrete is molded into a pipe-like shape to form a fresh concrete pipe by a centrifugal molding method using a rotating cylindrical mold, and a coating composition containing said polysulfide-modified epoxy resin is then applied to an inner surface of said fresh concrete pipe while it is still in an uncured state, whereby said polysulfide-modified epoxy resin penetrates into a surface layer of the fresh concrete pipe to form said intermediate layer having a thickness of 5–500μm.

9. The method of producing a concrete article according to claim 7 or 8, wherein said polysulfide-modified epoxy resin is a high-molecular weight epoxy compound represented by the following general formula:

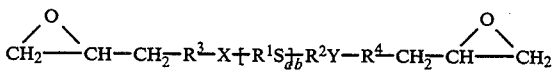

wherein each of $R^1$ and $R^2$ is an organic group, each of X and Y is a substituent selected from the group consisting of an —S— group, an —O— group and an —NH— group, each of $R^3$ and $R^4$ is a residual group of an epoxy prepolymer having two or more epoxy groups in each molecule, a is an integer from 0 to 5 inclusive (when a=0, at least one of X and Y is the —S— group), and b is an integer from 1 to 50 inclusive.

10. The method of producing a concrete article according to claim 9, wherein $R^1$ of the polysulfide-modified epoxy resin represented by said general formula is —$CH_2CH_2OCH_2OCH_2CH_2$—, and the average of a is 1.5–2.5.

11. The method of producing a concrete article according to any one of claims 7 to 10, wherein said layer of a cured epoxy resin modified with a polysulfide contains a bulking filler and/or a reinforcing filler.

* * * * *